Sept. 5, 1961   J. H. MacNEILL   2,998,874
SELECTIVELY ENGAGEABLE CLUTCH
Filed Feb. 24, 1958   3 Sheets-Sheet 1

INVENTOR
JOHN H. MacNEILL
BY Hurvitz + Rose
ATTORNEY

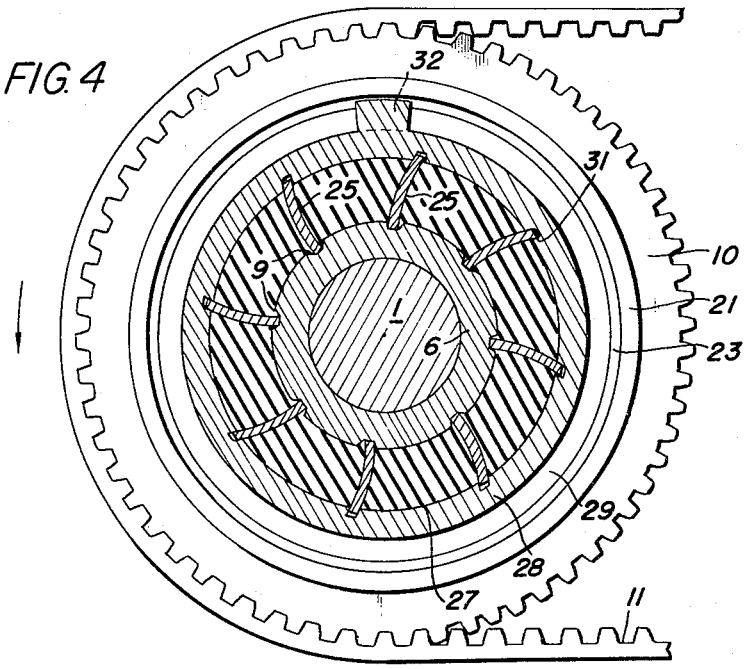
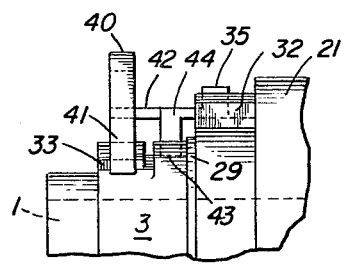
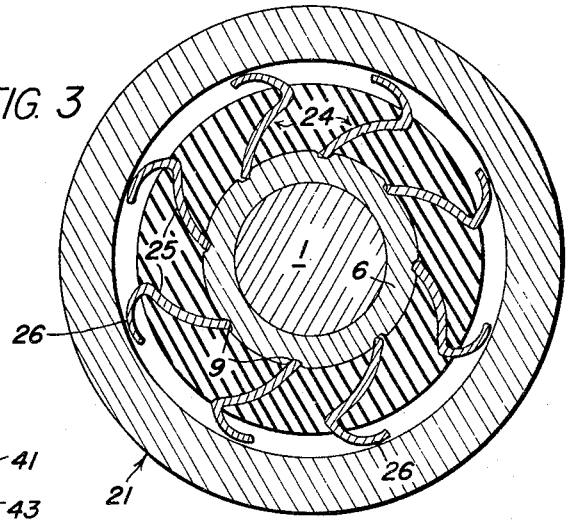
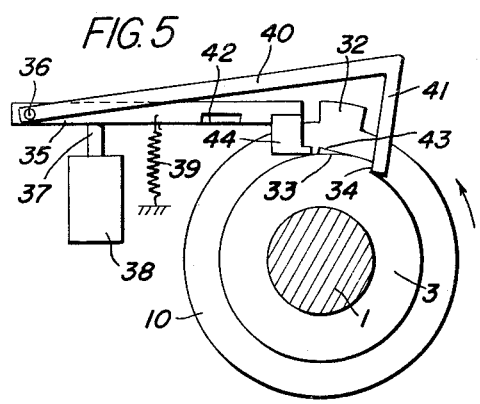

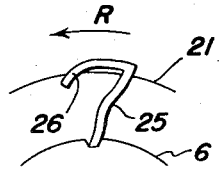
FIG. 6
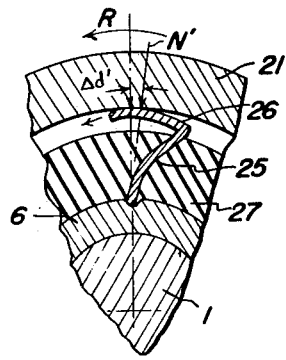
FIG. 7
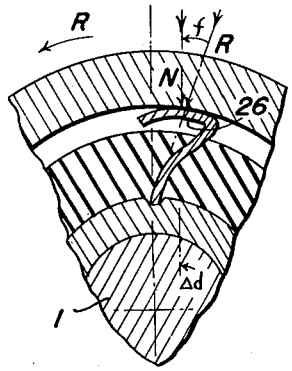
FIG. 8
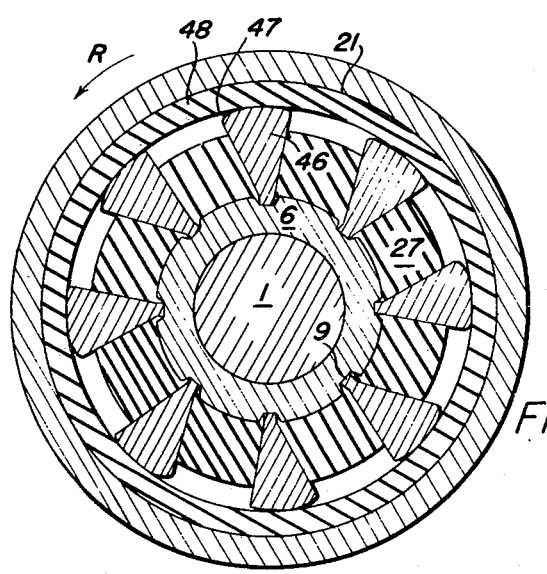
FIG. 10
FIG. 9
INVENTOR
JOHN H. MacNEILL
BY Hurvitz & Rose
ATTORNEY

United States Patent Office 2,998,874
Patented Sept. 5, 1961

2,998,874
SELECTIVELY ENGAGEABLE CLUTCH
John H. MacNeill, Melbourne, Fla., assignor to Soroban, Inc., Melbourne, Fla., a corporation
Filed Feb. 24, 1958, Ser. No. 717,185
9 Claims. (Cl. 192—45.1)

The present invention relates to clutches for producing rotation of a driven member in one direction only and more particularly to a selectively engageable one-way clutch.

It is an object of the present invention to provide a novel selectively engageable clutch that transmits rotational energy in one direction of rotation only.

It is another object of the present invention to provide a selectively engageable one-way clutch which is normally biased into the engaged position.

It is another object of the present invention to provide a selectively engageable one-way clutch employing a relatively small number of rugged and easily fabricated elements.

It is another object of the present invention to provide a selectively engageable one-way clutch having an inherent load limiting arrangement which allows slippage of the clutch upon overload so as to prevent permanent deformation of the various elements thereof.

It is another object of the present invention to provide a selectively engageable one-way clutch employing a plurality of blade-like members or sprags which may be rotated into selective engagement with a drive member and utilizing a resilient coupling between the members so as to allow slippage of the clutch upon overload, the resilient coupling also effecting an even distribution of load over the surface of the drive member and providing for the absorption of shocks.

It is yet another object of the present invention to provide in one embodiment thereof a selectively engageable one-way clutch employing a plurality of resilient blade-like members or sprags for selectively coupling a drive member to a driven member, the blade-like members being capable of sufficient flexure during overload to allow slippage of the clutch without damage to the clutching members.

It is still another object of the present invention to provide in another embodiment thereof a selectively engageable one-way clutch employing a plurality of blade-like members for selectively coupling a driven member to a drive member, the blade-like members engaging a resilient lining on said drive member to effect a resilient coupling between said members.

It is another object of the present invention to provide a selectively engageable one-way clutch employing a control member for rotating a plurality of blade-like members into and out of engagement with a drive member so as to effect selective engagement of the clutch.

Yet another object of the present invention is to provide a selectively engageable one-way clutch employing a plurality of blade-like members for coupling a cylindrical member to a coaxial hollow cylindrical member and to provide a control member for rotating the blade-like members into and out of a radial position between the cylindrical members to effect coupling and decoupling respectively of the clutch.

Still another object of the present invention is to provide a selectively engageable one-way clutch having coaxial cylindrical drive and driven members and a plurality of blade-like members or sprags, subsisting therebetween, for coupling the one cylindrical member to the other when the blades are rotated into radial position, the blades terminating adjacent the drive member, in an arcuate shoe approximately perpendicular to the blades and shaped such that when the blades contact the drive member a regenerative force is developed which tends to rotate the blades into a fully coupled position as determined by the load on the clutch.

It is yet another object of the present invention to provide a selectively engageable one-way clutch which is biased into the clutch engaged position and to provide control means therefor which may selectively overcome the biasing force and retain the clutch in the decoupling position.

The above and still further objects, features and advantages of the present invention will become apparent upon consideration of the following detailed description of one specific embodiment thereof, especially when taken in conjunction with the accompanying drawings, wherein:

FIGURE 3 is a view taken along section 2—2 of FIGURE 1 illustrating the clutch in the decoupled position;

FIGURE 4 is a view taken along section 4—4 of FIGURE 1 with a portion of the members broken away to disclose the clutch engaging elements;

FIGURE 5 is a schematic mechanical illustration of a stop and latching mechanism which may be employed to control selective engagement of the clutch of the present invention;

FIGURE 6 is a line diagram illustrating the shape of the blades or sprags relative to the contour of the elements with which it engages;

FIGURES 7 and 8 are cross-sectional detailed views of the blades or sprags in positions indicating various degrees of coupling;

FIGURE 9 is a view similar to FIGURE 8 illustrating a further embodiment of the present invention;

FIGURE 10 is a view similar to FIGURE 2 illustrating a still further embodiment of the present invention; and FIGURE 11 is a partial end view of the apparatus illustrated in FIGURE 5.

Figure 1:
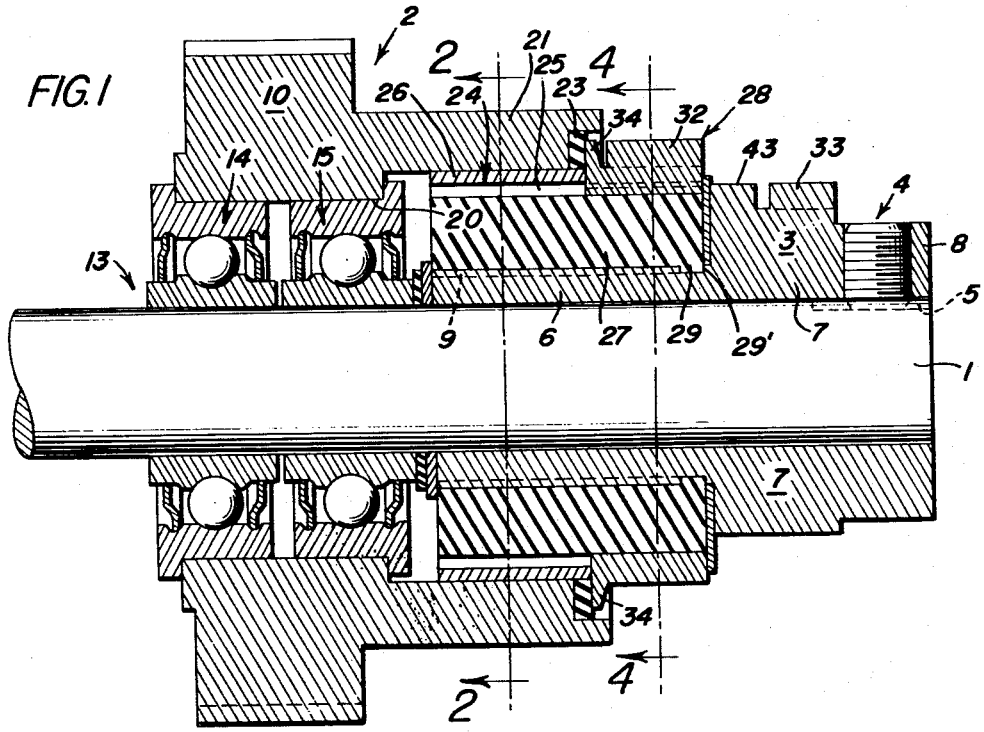
FIGURE 1 is a cross-sectional view in elevation of one embodiment of the clutch of the present invention.

Referring specifically to FIGURES 1–5 of the accompanying drawings, which illustrate a first embodiment of the present invention, a shaft to be driven is generally designated by the reference numeral 1 while the clutch is generally designated by the reference numeral 2. The clutch 2 comprises a hollow cylindrical hub or driven member 3 coaxial with the shaft 1 and secured thereto by a set screw 4 which cooperates with a flat 5 in the shaft 1 to permit rapid assembly and disassembly of the driven member 3 and the shaft 1. The hub 3 has a hollow cylindrical leg portion 6 extending axially of the shaft 1 and a base portion 7 perpendicular thereto. An extension 8 is provided below the base 7 for receiving the set screw 4. The leg portion 6 of the hub 3 is provided with a plurality of axially-extending, circumferentially-spaced grooves 9 which extend throughout the length thereof.

A drive member 10 is coupled to a source of rotary power, not illustrated, by means of a gear, drive belt, or chain 11, see FIGURE 4, and is rotatably supported on shaft 1 by a ball bearing assembly 13 comprising two distinct ball bearing mechanisms 14 and 15.

The drive member 10 has a hollow cylindrical sleeve 21 which is radially aligned with and spaced from a portion of the leg 6 of the hub 3. In order to provide coupling between the drive member 10 and the hub or driven member 3 of the selectively engageable, one-way clutch 2, there is provided a plurality of coupling members or sprags 24 each having a blade-like member 25 with an inner edge subsisting in a distinct groove 9 of the hub 3 and extending generally radially outward therefrom. The blades 25 extend throughout the length of the leg 6 of the hub 3 and the portions subsisting between the leg 6 and the sleeve 21 of the drive member 10 terminate adjacent the inner wall of sleeve 21 in transversely extending members 26 which extend from the radial blades 25 in a direction the same as the direction of rotation of the drive member 10 in this embodiment of the invention.

The blades 25 are imbedded in a rubber or neoprene matrix or retainer 27 which extends axially throughout the length of the leg 6 of the hub 3 and is in contact with the outer circumference thereof. The matrix 27 extends into the grooves 9 as far as is allowed by the blades 25 which preferably contact the bottom surface of the grooves 9. The matrix 27, adjacent the base 7 of the hub 3, is provided with an inwardly extending transverse flange 29 which extends into a groove 29' in the leg 6 of the hub 3, the groove 29' being of the same depth as the grooves 9. The groove 29' and flange 29 are provided to hold the matrix in its correct axial position. Surface bonding between the matrix 27 and the circumferential area of the outer circumference of the leg 6 may also be employed to retain the matrix. The matrix 27 serves to support and hold sprags 24 and further to urge the sprags into the engaged position illustrated in FIGURE 2 of the accompanying drawings.

In accordance with the present invention, it is desired to provide a selectively actuatable one-way clutch and selected actuation is achieved by means of a control member or hollow cylindrical ring 28 which extends between a washer 23 disposed in an annular recess in the end of the sleeve 21, and the base 7 of the hub 3. The inner circumference of the ring 28 is provided with a plurality of axially-extending, circumferentially-spaced grooves 31, each of which is approximately radially aligned with a different groove 9 in the leg 6 of the hub. The portions of the blades 25 extending between the leg 6 and the ring 28 are not provided with transverse members 26 but extend directly into the grooves 31 in the ring 28. The internal diameter of the ring 28 is such that it abuts the rubber or neoprene matrix 27 so that the matrix fills the space between the members 6 and 28.

The ring 28 is employed to control selective engagement of the clutch and more specifically when the ring 28 is rotated clockwise, as viewed in FIGURE 4 of the accompanying drawings, the sprags 24 are rotated clockwise about the edges disposed in the grooves 9, and the transverse members 26 are rotated out of contact with the sleeve 23 as illustated in the broken away portion of FIGURE 3. Due to the action of the matrix 27 it is necessary to maintain the ring 28 rotated clockwise with respect to the hub 3 since upon release of the ring 28, the matrix 27, being under compression, rotates the sprags 24 counter-clockwise as viewed in FIGURE 4, until the outer surfaces of the members 26 come into contact with the inner wall of the sleeve 21.

The apparatus for controlling the ring 28 so as to produce selective engagement and disengagement of the clutch 2 is illustrated in FIGURES 1, 5 and 11. The ring 28 carries a stop member 32 which constitutes a raised rectangular shoulder on the circumference of the ring. The outer surface of the base 7 of the hub 3 has an arcuate portion 33 of gradually increasing radius terminating in a radially extending lip which terminates in a surface of lesser radius than the maximum radius of the surface 33. A first arm 35 which extends perpendicular to the shaft 1 has one end pivoted about a shaft 36, extending parallel to the shaft 1, and has its other end terminated adjacent the stop member 32 on the ring 28. The underside of the arm 35 is engaged by movable core 37 of a solenoid 38 and is biased downwardly, as viewed in FIGURE 5, by means of a spring 39. The arm 35 may be selectively raised by energization of the solenoid 38. When the solenoid 38 is deenergized the end of the arm 35 adjacent the stop 32 engages the stop and prevents rotation of the ring 28.

A latch arm 40 has one end pivoted about the shaft 36 and has its other end terminated in a downwardly-extending hook member 41 adapted to engage the lip or radial surface 34 of the latch member 33. The arm 35 carries a transverse extension 42 which extends under the arm 40 and is adapted, upon upward movement of the arm 35, to raise the arm 40 so that the hook members 41 is disengaged from the stop 33 after and only after the arm 35 is disengaged from the stop 32.

Figure 2:
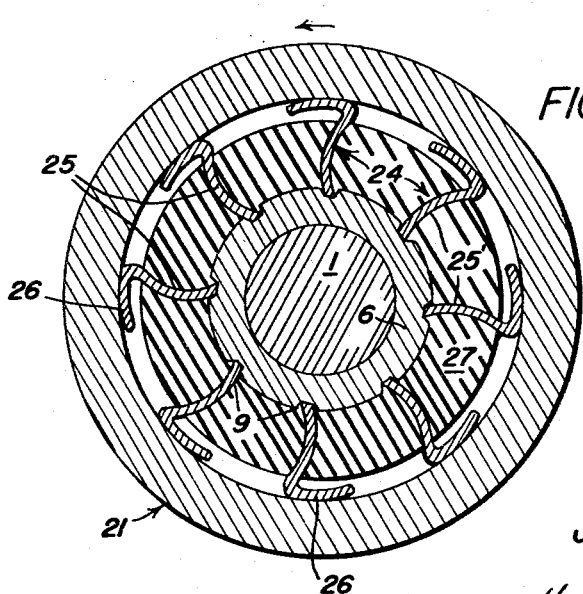
FIGURE 2 is a view taken along section 2—2 of FIGURE 1.

Assuming that initially the arms 35 and 40 are raised and that clutch is engaged, the various elements of the clutch assume the position illustrated in FIGURES 2 and 4. When it is desired to disengage the clutch, the solenoid 38 is deenergized and the arms 35 and 40 drop downwardly into engagement with the surfaces of the ring 28 and the hub 3, respectively.

Upon the stop 32 engaging the end of the arm 35, the ring 28 is prevented from further rotation while the hub 3 continues to rotate counter-clockwise because of its momentum. The lower end of the hook 41 which is riding along the surface 33 of the hub 3, drops down over the lip 34 when the hub 3 has rotated sufficiently and prevents clockwise rotation of hub 3 with respect to the ring 28. Thus, the hub 3 and ring 28 are positively maintained in a position with respect to one another wherein the transverse members 26 of the sprags 24 are out of contact with the sleeve 21 of the drive member 10 and the driven member 3 remains decoupled from the drive member. When it is again desired to activate the clutch, the solenoid 38 is energized and the arm 35 is initially disengaged from the stop 32. This permits the resilient matrix 27 to rotate the ring 28 counter-clockwise and the clutch to again engage. After the arm 35 has been raised sufficiently to disengage the stop member 32, the arm 40 is raised by the extension 42 so that the hook 41 does not drag on the surface of the hub 3.

In order to prevent the inertia of the load on the shaft 1 from damaging the rubber matrix 27 in consequence of excessive relative rotation between the members 6 to 28, a second stop lug 43 may be provided on the hub 3. The stop lug 43 is disposed axially between the lip 34 and the stop lug 32 and also comprises a rectangular member. The rectangular stop lug 43 is adapted to be engaged by a rectangular extension 44 of the arm 35. Immediately after the arm 35 engages the stop member 32 and the members are declutched, the arm 44 engages the lug 43 and positively stops shaft rotation. The position of the elements 43 and 44 is such with respect to the position of the elements 32 and 35 that rotation of the shaft 1 is stopped before the matrix 27 is excessively stretched or deformed.

As previously indicated, it is an object of the present invention to provide for regeneration of the force tending to couple the inner sleeve 6 to the outer sleeve 21 until a balance is reached between driving force and the restraining force of the system and further to provide an inherent load-limiting feature so that the clutch does not become overloaded. Both of these effects are achieved in accordance with one embodiment of the present invention by properly contouring the transverse members 26 of the sprags 24 and further by making this member relatively resilient.

Reference is initially made to FIGURE 6 of the accompanying drawings, wherein is illustrated a diagram indicating the variations of radius and curvature along the length of the member 26, in its unrestrained condition, with respect to the inner surface of the member 21 with the radial differences being greatly exaggerated for the purpose of visual illustration. It will be noted by reference to FIGURE 6, and again it is wished to stress that the diagram indicates the position that the transverse member 26 would assume with respect to the center hub if it were not restrained by the sleeve 21, that the leading edge of the blade 26 is at a lesser distance from the axis of rotation of the blade 25 than the inner surface of the member 21 so as to insure that the leading edge of the transverse member 26 does not dig into the surface 21 as initial coupling is effected but rather engages the surface 21 along a curved surface of the member 26. Thereafter, the radius of the blade increases relatively rapidly so that as the sprag 24 is rotated counter-clockwise the normal force between the member 26 and the sleeve 21 rapidly increases. Assuming that the shaft 1 and therefore the sleeve 6 is stationary and the blade 26 is rotated into engagement with the sleeve 21, initially, both the normal force and the frictional force between the blade 26 and the sleeve 21 are quite small. However, at this time, the force between the blade 26 and the sleeve 21 lies along a vector N' (see FIGURE 7) passing slightly to the left of the center of rotation of the sprag 24 and at a slight clockwise angle to a radius passing through the center of rotation of the sprag 24 and shaft 1 so that the torque, exerted by the force N' times the lever arm $\Delta d'$ which is the distance between the vector N' and a radius through the center of rotation of the sprag 24, both taken at the point of contact of 21 and 26, is slightly less than and opposite to the tangential or frictional force at the aforesaid point of contact times $\Delta r$ or the effective radial dimension of the sprag 24. The resultant of these two torques, the counter-clockwise torque resulting from the frictional force and the clockwise torque attributable to the contact force vector N', is in the direction of the frictional force and the sprags 24 continue to rotate in a counter-clockwise direction, as viewed in FIGURE 7. Rotation of the sprags 24 continues until the torque exerted by the frictional force is balanced by the torque in the opposite direction exerted by the normal force. Specifically, and reference is made to FIGURE 8, as the sprags 24 continue to rotate counter-clockwise with respect to their centers of rotation, portions of the blades 26 of increasing diameter are presented to the sleeve 21 and since members 26 are resilient, they bend and in so doing increase their resistance to bending. In consequence the normal force between the members 26 and the sleeve 21 represented by the vector N increases rapidly. Further, the point of contact between these two members moves clockwise, as viewed in FIGURE 8. Therefore, although the frictional force is, of course, increasing as the normal force increases, the lever arm $\Delta d$ of the normal force vector N is increasing whereas the lever arm of the frictional force is fixed. Eventually, a point of balance is reached between the two torques and a resultant vector R is developed which is directed through the center of rotation or the axis of rotation of the sprag 24 and an equilibrium condition is established so that the sprag 24 remains in the same relative position in a rotational sense with respect to both sleeves 6 and 21.

Thereafter, if a further restraining force is applied to the shaft 1, that is, if the load is increased on the shaft 1, the lower end of the blade 25 is initially restrained and the upper end is rotated by the sleeve 21. This results in a further counter-clockwise rotation of the sprags 24 in a force regenerative sense which continues until the couples about the center of rotation of the sprags 24 are again equal. Thus, it is seen that during any increase in the load and during initial coupling of the sprags 24, a regenerative force is applied to the sprags so as to rotate them at their centers of rotation until equilibrium is established in the force system.

The overload prevention feature of the present invention is also a result of proper contouring and resiliency of the member 24 and reference is again made to FIGURE 6 of the accompanying drawing. It will be noted in FIGURE 6 that a portion of the transverse member 26 immediately adjacent the point of connection to the blade 25 is of the same radius of curvature as the sleeve 21, and therefore when the blade 25 has been rotated so that this portion of the transverse member 26 is presented to the sleeve 21, the point of contact between the sleeve 21 and transverse member moves abruptly to the right preventing further rotation of the sprag 24, by increasing the clockwise torque about the center of rotation. In consequence of the inability to increase the normal force between these two members, the frictional force also cannot be increased, and therefore as the load is increased, slippage occurs between the transverse member 26 and the sleeve 21. Since the friction force is not increased, the normal force couple tends to rotate the sprag 24 clockwise and decreases the force between the member 26 and the sleeve 21 and therefore limits the load carrying capacity of the clutch.

It will be noted that the blades 25 are bent as at 25' in order to permit flexure of the member. Such flexure is required in this embodiment of the invention, since the blades 25 have a greater radial length when rotated into the fully engaged position, than the spacing between the bottom of the grooves 9 and sleeve 21.

The resilient members 25 and 26 of the sprags 24 serve a further function in that they permit the utilization of more than three sprags 24. If the sprags were rigid, upon engagement of the clutch, the rigid blades would contact the hard inner surface of the sleeve 21 of the drive sprocket 10 and it would be substantially impossible due to manufacturing variations to obtain contact between more than three of the members 26 and the sleeve 21. A three point contact establishes the circumference of a circle and the play present in the bearing assemblies 14 and 15 would permit alignment of sleeve 21 on only three of the members 26 to the exclusion of all others. The utilization of the resilient members 26, however, permits contact between all of the members 26 and the sleeve 21 by making the radial length of the sprags 24 from grooves 9 to the points of contact on the member 26 greater than the distance between the bottom of the grooves 9 and the inner circumference of the sleeve 21 when the members 25 and 26 are not flexed. In consequence, all of the members 25 and 26 bend slightly when the clutch is engaged to accommodate the different lengths of the members 26 or eccentricity of the sleeve 21. The fact that more than three sprags 24 may be employed, serves to increase the torque transmitting properties of the clutch in that it permits the load to be evenly distributed over more areas of the sleeve 21 thereby reducing the possibility of local deformation of the sleeve 21 immediately adjacent a particular member 26. The resilient members also serve to absorb much of the shock encountered during engagement of the clutch, at high speed, or when a large inertia is part of the load.

A further feature of the one-way clutch of the present invention is that energy cannot be transferred from the drive member 10 to hub 3 upon clockwise rotation of the sprocket since if this is attempted, the blades 24 are rotated with respect to the grooves 9 in the hub 3 until the ends of the blades 26 are just dragging on the liner 22 and therefore cannot transmit torque. This condition is shown in FIGURE 3 which also illustrates the clutch disengaged condition when the hub 3 is decoupled from the drive member 10.

It can be seen from the above that the present invention provides a selectively-engageable one-way clutch, wherein excessive overloading of the clutch is prevented by the utilization of resilient members 24 which distributes the load over a large area of the sleeve 21, wherein a clutching bias is established by a resilient matrix which also serves as a retainer for the various clutching members and wherein the members 26 of the sprags 24 are contoured such that the clutching force is regenerative and such that upon overloading of the clutch the members 26 yield and slide with respect to the sleeve 21 and the clutch is not damaged.

It is not intended to limit the present invention to a sprag as illustrated in the preceding figures of the accompanying drawings, and specifically to a blade in which the transverse member is directed in the direction of rotation of the clutch. Reference is now made to FIGURE 9 wherein elements similar to the elements of FIGURE 6 are designated by the same numbers with primes. A blade configuration is illustrated in which a transverse member 26' of a sprag 24' is directed oppositely to the direction of rotation of the clutch. In this figure the leading edge of the blade 26', which is at the juncture of the transverse member 26' and a blade 25', is rounded so that when the clutch is coupled, the member 26' does not dig into the surface of sleeve 21' and therefore does not damage it.

In this embodiment also the radius of the sprag 24', from its center of rotation to its outer edge, increases gradually throughout its entire length and a regenerative force is provided over a predetermined length of the blade as determined by the resiliency of the blade taken with respect to the rate of increase of radius of the blade. As the sprag 24' is rotated counter-clockwise in the direction of rotation of the clutch, the normal force between the member 26' and the sleeve 21' gradually increases and therefore increases the frictional force therebetween to increase the load which may be assumed by the clutch. However, after a predetermined rotation of the blade counter-clockwise, a portion of the member 26' is reached where the force which may be applied by the resilient member cannot be increased since the force which may be exerted by the cantilevered member 26' has reached a maximum. Thereafter, the force between the member 26' and the sleeve 21' cannot be increased and the frictional force cannot be increased so that any attempt to increase the output of the clutch results in slippage between the members 21' and 26'.

It will be noted that in this embodiment of the present invention, the lower end of the blade 25' is bent as at 45 so as to enter the groove 9' along the radius of sleeve 6 at this point. It is apparent that in this embodiment the bent portion 45 of blade 25' must be provided so that the blade 25' may drive the sleeve 6'. If the blade were to enter the groove 9' at the angle of the remainder of the blade, rotational force applied to the blade 25' would merely tend to drag it out of the groove 9' whereas the bent portion prevents such operation by insuring contact between the two flat and parallel surfaces.

Thus far the clutch of the present invention has been described as utilizing sprags having resilient transverse portions. It is not intended to limit the present invention to apparatus where the blades 26 or 26' are resilient since the resiliency required to provide regenerative coupling and load limit may be provided by a resilience liner for the sleeve 21. In such an embodiment of the present invention the sprags may take the form of the sprags either in FIGURES 1 through 8 or FIGURE 9 or may take the form of sprags illustrated in FIGURE 10 of the accompanying drawings. In the embodiment of the invention illustrated in FIGURE 10, a generally wedge-shaped sprag or member 46 is employed having an upper surface 47, intended to contact a liner 48 of the sleeve 21, which surface bears a contour substantially identical with the counter of the surface illustrated in FIGURES 6, 7 and 8 or 9 of the accompanying drawings. The action of this clutch is identical with that of the prior figures except that the resiliency required to accept a member having a larger length than the distance between the liner 48 and the sleeve 6 is provided by the liner 48. The portion of the sprags 46 subsisting between the sleeve 6 and the ring 28 may be the same as that of the sprags 24 illustrated in FIGURE 4 or may be as illustrated in FIGURE 10 with rectangular protrusions extending into the grooves 31.

It should be noted that if sprags are resilient, generally liner 48 may be eliminated and alternatively the liner may be employed and the sprags made non-resilient. In the latter configuration, the sprag is contoured to provide torque slippage prior to clutch destruction when operated against liner 48.

The apparatus of the invention has been described as a clutch, but it is not intended to limit the apparatus to such a use, since by making the shaft 1 a stationary member the apparatus becomes a selectively engageable brake having overload prevention features. In such case, arms 35 and 40 must be replaced by solenoids adapted to rotate member 28.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A selectively-engageable, one-way clutch comprising a cylindrical driven member, a hollow cylindrical drive member coaxial with and rotatable about said driven member, a hollow cylindrical control member coaxial with and rotatable about said driven member, said driven member having a plurality of axially-extending grooves in radial alignment with at least a portion of said drive member and a portion of said control member, said grooves being spaced about the circumference of said driven member, a plurality of coupling members extending axially in said grooves in said driven member, said coupling members having a first axial portion subsisting between said driven member and said control member, said control member having means for engaging said coupling members, said coupling members having a second axial portion subsisting between said driven member and said drive member and having a radial length varying from shorter than to longer than the difference between the radius of the inner circumference of said drive member and the radii, with respect to the axis of said driven member, at the base of the grooves in said driven member, releasable means for maintaining said control member at a predetermined rotational angle with respect to the axial grooves of said driven members so as to maintain said coupling members out of contact with the inner circumference of said drive member, and resilient means for urging said control member in a direction to alter said rotational angle to bring said coupling members into contact with said drive member.

2. The combination in accordance with claim 1, further comprising means for releasably latching said control member in an angular position with respect to said driven member so that said blades are out of contact with said drive member, said means for latching comprising means, actuatable when said clutch is engaged and all members are rotating as a unit, for initially engaging said control means for preventing further rotation thereof and thereby to effect rotation of said control means with respect to said driven member so as to disengage the clutch and means for holding said driven member in a rotated position with respect to said control means.

3. A selectively-engageable, one-way clutch comprising a cylindrical driven member having a plurality of circumferentially-spaced, axially-extending grooves, a hollow cylindrical drive member coaxial with and rotatable with respect to said driven member, a plurality of relatively thin blades extending axially in said grooves and having a first portion subsisting between said drive member and said driven member, the overall length of said blades being in part greater that the radial distance between said drive member and said driven member and means for selectively engaging said blades with said drive member including, a hollow cylindrical control member coaxial with and rotatable with respect to said driven member and axially aligned with said drive member, said blades having a second portion subsisting between said control member and said driven member, said control member having a plurality of spaced means for engaging said second portion of said blades and being rotatable with respect to said driven member to rotate said blades out of contact with said drive member and bias means for urging said blades to rotate into contact with said drive member.

4. The combination according to claim 3 wherein each of said blades includes a transverse portion extending transversely from said first portion of said blades adjacent said drive member.

5. The combination in accordance with claim 4, wherein said transverse member has a leading portion with a decreasing radius and a trailing portion with a radius approximately equal to the radius of curvature of said drive member.

6. The combination in accordance with claim 4, wherein said transverse member is resilient and has an increasing radius throughout its angular length.

7. The combination in accordance with claim 4, further comprising a resilient sleeve disposed between said blades and said drive member and coupled to said drive member.

8. A selectively-engageable, one-way clutch comprising a generally cylindrical first member, a hollow cylindrical second member coaxial with and rotatable about said first member, a plurality of axially-extending, circumferentially-spaced resilient members disposed between said first and second members, said first member having a plurality of axially-extending circumferentially-spaced, resilient-member-engaging surfaces, said resilient members having a radial length such that when rotated into a predetermined position with respect to said resilient-member-engaging surfaces, they engage opposed surfaces of said first and second members, and means for selectively rotating said resilient members out of said predetermined position, said means for selectively rotating comprising a hollow control member coaxial with and rotatable about said first member, said control member having a plurality of circumferentially-spaced, axially-extending, resilient-member-engaging surfaces which are spaced radially outward from said surfaces of said first member and means for rotating said control member to rotate said resilient members out of said predetermined position, said coupling members having a surface adapted to engage said first member, said surface having a portion of increasing radius terminating in a portion having a radius of curvature approximately equal to the radius of curvature of the inner surface of said first member.

9. A selectively-engageable, one-way clutch comprising a cylindrical driven member, a hollow cylindrical drive member coaxial with and rotatable about said driven member, a hollow cylindrical control member coaxial with and rotatable about said driven member and axially aligned with said drive member, said driven member having a plurality of axially-extending grooves in radial alignment with at least a portion of said drive member and said control member, said grooves being spaced about the circumference of said driven member, a plurality of coupling members extending axially in said grooves in said driven member, said coupling members having a first axial portion subsisting between said driven member and said control member, said control member having means for engaging said coupling members, said coupling members having a second axial portion subsisting between said driven member and said drive member, said second portion having at least a section thereof of greater radial length than the difference between the radii of the inner circumference of said drive member and the radii, with respect to the axis of said driven member, at the base of the grooves in said driven member, releasable means for maintaining said control member at a predetermined rotational angle with respect to the axial grooves of said driven members so as to maintain said coupling members out of contact with the inner circumference of said drive member, and resilient means for urging said control member in a direction to alter said rotational angle to bring said coupling members into contact with said drive member.

References Cited in the file of this patent

UNITED STATES PATENTS

| 2,075,130 | Osterholm | Mar. 30, 1937 |
| 2,428,968 | Gruenberg | Oct. 14, 1947 |
| 2,520,004 | Gondek | Aug. 22, 1950 |
| 2,562,613 | Halberg | July 31, 1951 |
| 2,721,638 | Palm | Oct. 25, 1955 |
| 2,735,525 | Martindell | Feb. 21, 1956 |
| 2,803,145 | Fisher | Aug. 20, 1957 |

FOREIGN PATENTS

| 298,673 | Great Britain | Oct. 15, 1928 |
| 678,117 | France | Dec. 23, 1929 |